United States Patent
Choi et al.

(10) Patent No.: US 10,912,286 B2
(45) Date of Patent: Feb. 9, 2021

(54) AQUARIUM WITH WIRELESS LIGHTING

(71) Applicant: PR TECHNOLOGY INC., Vancouver (CA)

(72) Inventors: Chang Uk Choi, Suwon-si (KR); Sang Hoon Hwang, Anyang-si (KR)

(73) Assignee: PR Technology inc., Vancover (CA)

( * ) Notice: Subject to any disclaimer, the term of this patent is extended or adjusted under 35 U.S.C. 154(b) by 267 days.

(21) Appl. No.: 16/154,569

(22) Filed: Oct. 8, 2018

(65) Prior Publication Data
US 2019/0230906 A1    Aug. 1, 2019

(30) Foreign Application Priority Data
Jan. 26, 2018    (KR) ................. 10-2018-0010265

(51) Int. Cl.
| | |
|---|---|
| *A01K 63/06* | (2006.01) |
| *A01K 63/04* | (2006.01) |
| *H02J 50/12* | (2016.01) |
| *F21V 33/00* | (2006.01) |
| *A01K 63/00* | (2017.01) |
| *F21Y 115/10* | (2016.01) |
| *F21W 131/308* | (2006.01) |
| *H02J 50/40* | (2016.01) |

(52) U.S. Cl.
CPC ............ *A01K 63/06* (2013.01); *A01K 63/003* (2013.01); *A01K 63/042* (2013.01); *A01K 63/045* (2013.01); *A01K 63/047* (2013.01); *F21V 33/00* (2013.01); *H02J 50/12* (2016.02); *F21W 2131/308* (2013.01); *F21Y 2115/10* (2016.08); *H02J 50/40* (2016.02)

(58) Field of Classification Search
CPC ............................... A01K 63/00; A01K 63/06
See application file for complete search history.

(56) References Cited

U.S. PATENT DOCUMENTS

| | | | | |
|---|---|---|---|---|
| 7,021,782 | B1* | 4/2006 | Yerian | A01K 63/06 362/101 |
| 2008/0217225 | A1* | 9/2008 | Allis | A01K 63/042 210/167.22 |
| 2014/0033984 | A1 | 2/2014 | Li et al. | |
| 2014/0102376 | A1 | 4/2014 | Li et al. | |
| 2014/0230741 | A1 | 8/2014 | Allen et al. | |
| 2015/0230436 | A1 | 8/2015 | Lutz et al. | |
| 2015/0313190 | A1* | 11/2015 | Edwards | A01K 61/85 119/230 |

(Continued)

FOREIGN PATENT DOCUMENTS

| | | |
|---|---|---|
| JP | 09-103584 | 4/1997 |
| JP | 2014-223262 A | 12/2014 |

(Continued)

*Primary Examiner* — Monica L Barlow
(74) *Attorney, Agent, or Firm* — Lewis Roca Rothgerber Christie LLP

(57) ABSTRACT

An aquarium has wireless lighting which is configured to turn on a lighting device provided inside the aquarium and vertically move the lighting device in water by a wireless magnetic resonance method. Therefore, a light that can be maintained in a submerged state may be provided, thereby providing better aesthetic effects than existing lights of aquariums. In addition, additional devices such as a filter can be moved in water by using a magnetic field, thereby improving functional effects.

10 Claims, 4 Drawing Sheets

(56) References Cited

U.S. PATENT DOCUMENTS

2016/0021855 A1* 1/2016 Grajcar ................ A01K 63/06
362/249.02

FOREIGN PATENT DOCUMENTS

| KR | 10-2009-0040117 A | 4/2009 |
|----|-------------------|--------|
| KR | 20-0453596 | 5/2011 |
| KR | 10-1088401 | 12/2011 |

* cited by examiner

AQUARIUM WITH WIRELESS LIGHTING

CROSS-REFERENCE TO RELATED APPLICATION(S)

This application claims priority to and the benefit of Korean Patent Application No. 10-2018-0010265 filed on Jan. 26, 2018 in the Korean Intellectual Property Office, the disclosure of which is incorporated herein by reference in its entirety.

BACKGROUND

1. Field

The present invention relates to an aquarium with wireless lighting.

2. Description of Related Art

In general, households or restaurants use aquariums filled with seawater or freshwater to raise fishes or reptiles (for example, turtles) or keep fishes or reptiles for a certain period of time. That is, a transparent water tank having an internal space is filled with water so that fishes or reptiles can live therein, and in some cases, objects such as an aquatic plant or a lamp are placed in the water thank to provide an environment suitable for fishes or reptiles as well as for ornamental purposes. In addition, when raising tropical fish in an aquarium, a heater may be additionally installed in a water tank to adjust the temperature of water to be suitable for the tropical fish. In addition, salinity may be frequently checked and adjusted for sea fish or reptile. To this end, various measuring devices are installed in an aquarium, and electric wires for supplying power to the measuring devices have to be laid in the aquarium. In this case, however, ornamental fish may be electrocuted, or a user (or a custodian) managing the aquarium may be struck by electricity. Therefore, countermeasures are necessary.

Furthermore, in general, lights are installed on upper sides of aquariums. However, if lights are installed inside aquariums (that is, in water), better aesthetic effects may be obtained. In this case, however, electric wires installed in the aquariums to supply power to the lights installed in the aquariums may cause electric shocks, and it may be difficult to manage the electric wires.

Korean Patent Application Laid-open Publication No. 10-2009-0040117 (patent document 1) discloses "a method of controlling an aquarium light." According to the control method, a light emitting diode (LED) lamp having a transparent tube shape is installed on an upper side of an aquarium having a glass front side through which the inside of the aquarium can be seen; red, green, and blue LED driving units are controlled through a control unit by manipulating a remote control so as to selectively turn on red, green, and blue LEDs; and each time a menu selection key is turned on, red-green-blue automatic lighting, red+green-green+blue-blue+red automatic lighting, automatic lighting, white lighting, psychedelic lighting, brightness adjustment, and panorama menus can be sequentially selected.

According to patent document 1, various lighting effects such as fixed color selection, red-green-blue automatic lighting, red+green-green+blue-blue+red automatic lighting, automatic lighting, white lighting, psychedelic lighting, brightness adjustment, and a panorama can be obtained according to control of the control unit receiving a selected option from the remote control. However, since the lighting device (that is, the LED lamp) is not installed inside the aquarium but is installed on an outer side of the aquarium, that is, on the upper side of the aquarium like other general lighting devices of the related art, aesthetic effects that can be viewed from the outside of the aquarium are limited.

RELATED ART DOCUMENT

Patent Document

Korean Patent Application Laid-open Publication No. 10-2009-0040117 (published on Apr. 23, 2009).

SUMMARY

The present invention is proposed by considering the above-described matters, and a feature according to example embodiments of the present invention is to provide an aquarium with wireless lighting which includes a light installed inside the aquarium and configured to be operated and moved by wireless. According to example embodiments, an internal light can be operated by wireless and can also be moved by wireless.

To achieve the above-described feature, example embodiments of the present invention provide an aquarium with wireless lighting, the aquarium including: a water tank including a transmission resonator located at a bottom thereof and connected to an AC power source, the water tank being configured to be filled with water; and a lighting buoyancy body including a lighting device having a specific gravity less than a specific gravity of the water filled in the water tank and configured to illuminate the water tank, a reception resonator connected to the lighting device, and a first magnetic part, wherein the lighting device of the lighting buoyancy body is configured to be operated by transmitting power from the transmission resonator to the reception resonator by wireless, wherein attractive force pulling the first magnetic part is generated in response to a magnetic field generated by the transmission resonator, wherein when the attractive force is adjusted to be greater than buoyancy applied to the lighting buoyancy body, the lighting buoyancy body is moved downward in the water tank, and wherein when the attractive force is adjusted to be less than buoyancy applied to the lighting buoyancy body, the lighting buoyancy body is moved upward in the water tank.

In this case, a surface of a transmission resonant coil of the transmission resonator and a surface of a reception resonant coil of the reception resonator may be arranged in parallel to each other such that the surfaces may face each other.

According to example embodiments, at least one second magnetic part configured to be magnetized by the magnetic field generated by the transmission resonator may be arranged around the transmission resonator.

According to example embodiments, a first repeater including a coil therein may be provided on a lateral side of the water tank to relay magnetic resonance between the transmission resonator and the reception resonator.

According to example embodiments, a second repeater including a coil therein may be placed between the transmission resonator and the reception resonator to relay magnetic resonance therebetween.

According to example embodiments, at least one of a thermostat, a bubble generator, or a filter, which includes a reception resonator, may be in the water tank.

According to example embodiments, the thermostat, the bubble generator, or the filter may have a specific gravity less than a specific gravity of water and may further include a third magnetic part, and the third magnetic part may respond to the magnetic field generated by the transmission resonator such that the thermostat, the bubble generator, or the filter may be vertically moved in the water tank according to control of strength of the magnetic field.

According to example embodiments, the lighting buoyancy body may be maintained at a predetermined depth in the water of the water tank by adjusting magnitude of a magnetic force applied to the first magnetic part of the lighting buoyancy body through control of strength of the magnetic field generated by the transmission resonator.

According to example embodiments, a device configured to apply upward force to the water filled in the water tank may be placed on the bottom surface of the water tank so as to move upward the lighting buoyancy body submerged in the water of the water tank.

According to example embodiments, at least one propelling device may be provided on the lighting buoyancy body for smooth movement of the lighting buoyancy body in the water.

As described above, according to example embodiments of the present invention, the lighting device provided inside the aquarium can be powered on and vertically moved in water by a wireless magnetic resonance method. In addition, since a light that can be maintained in a submerged state is provided, better aesthetic effects than those by lights of aquariums of the related art may be obtained. In addition, because additional devices such as a filter can be moved in water by using a magnetic field, functional effects may also be improved.

DETAILED DESCRIPTION

Terms and words used in the description and claims should not be construed as being limited to general meanings or dictionary definitions, but should be construed according to the technical concepts and ideas of the present invention based on the principle that inventors can define terms to properly describe their inventions.

It will be further understood that the terms "comprises" and/or "comprising" used herein specify the presence of stated features or elements, but do not preclude the presence or addition of one or more other features or elements. In the present disclosure, terms such as "unit," " . . . or/er," "module," and "device" are used to denote a unit having at least one function or operation and implemented with hardware, software, or a combination of hardware and software.

Hereinafter, embodiments of the present invention will be described in detail with reference to the accompanying drawings.

Before describing embodiments of the present invention, wireless power transmission technology employed in embodiments of the present invention will now be briefly described.

Wireless power transmission technology is for transmitting electrical energy from a power source to a load by wireless. A general wireless power transmission system transmits power from a transmission resonator to a reception resonator. In this case, a transmission unit and a reception unit are separated in a wireless manner.

AC power may be supplied from a power source to the reception resonator by magnetic resonance of a resonant coil of the transmission resonator and a resonant coil of the reception resonator. That is, if magnetic resonance is induced by constructing a resonant circuit between the two coils, the two coils strongly interact with each other.

Hereinafter, embodiments of the present invention will be described based on the wireless power transmission technology.

Figure 1:
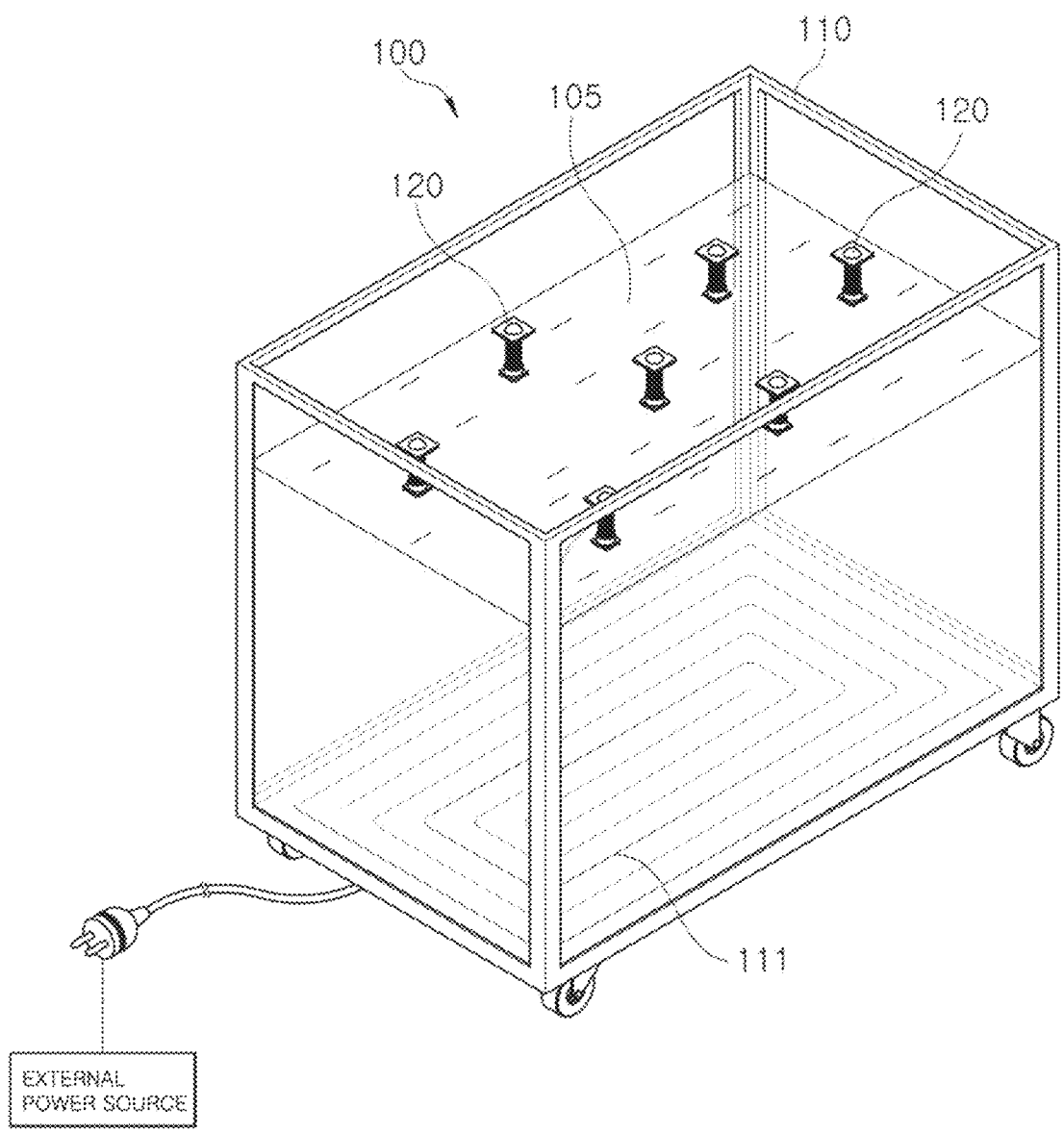
FIG. 1 is a view illustrating an overall configuration of an aquarium with wireless lighting according to an embodiment of the present invention.
Figure 2:
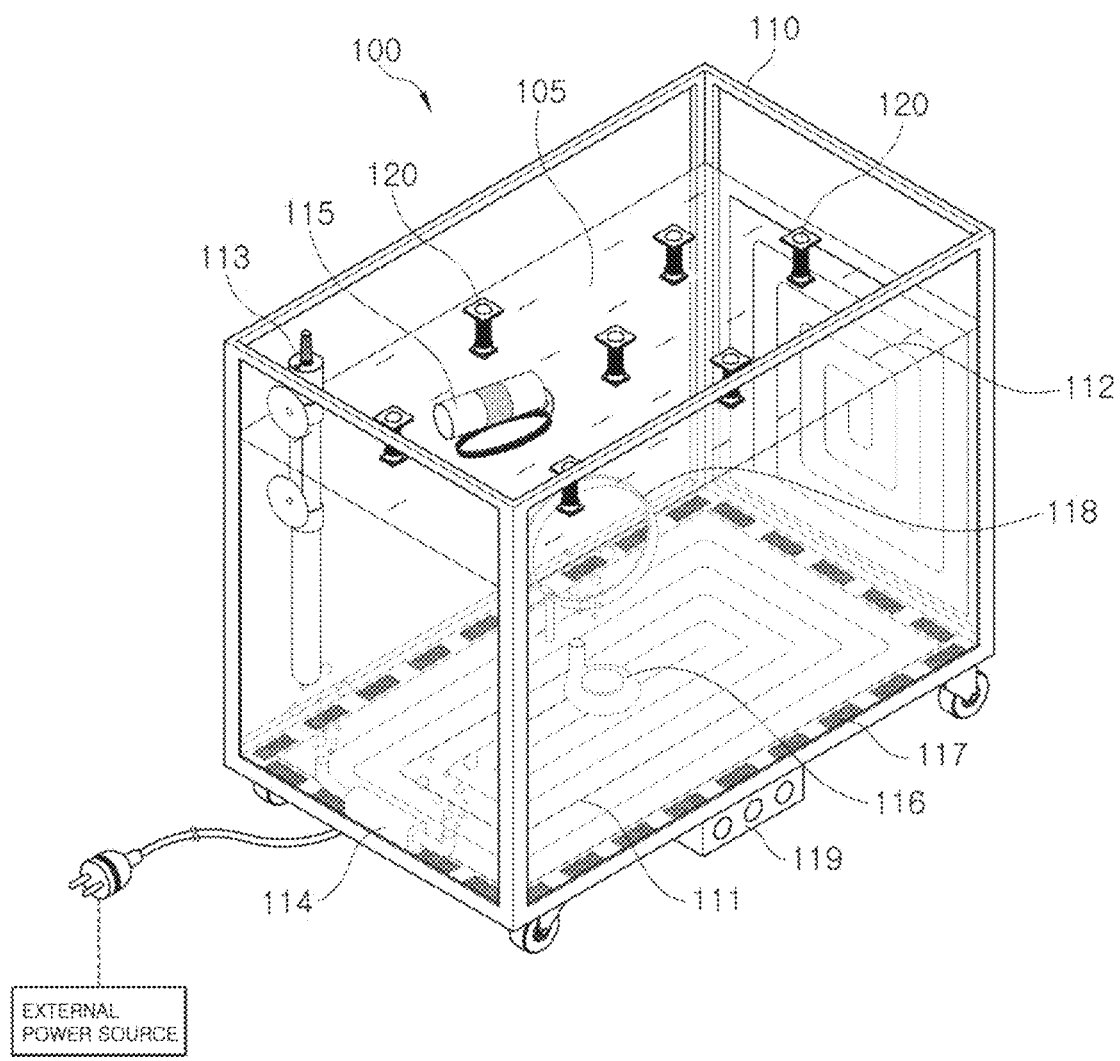
FIG. 2 is a view illustrating the aquarium with wireless lighting illustrated in FIG. 1 when devices such as a repeater, a thermostat, a bubble generator, a pump, and a controller are additionally installed on the aquarium.
Figure 3:
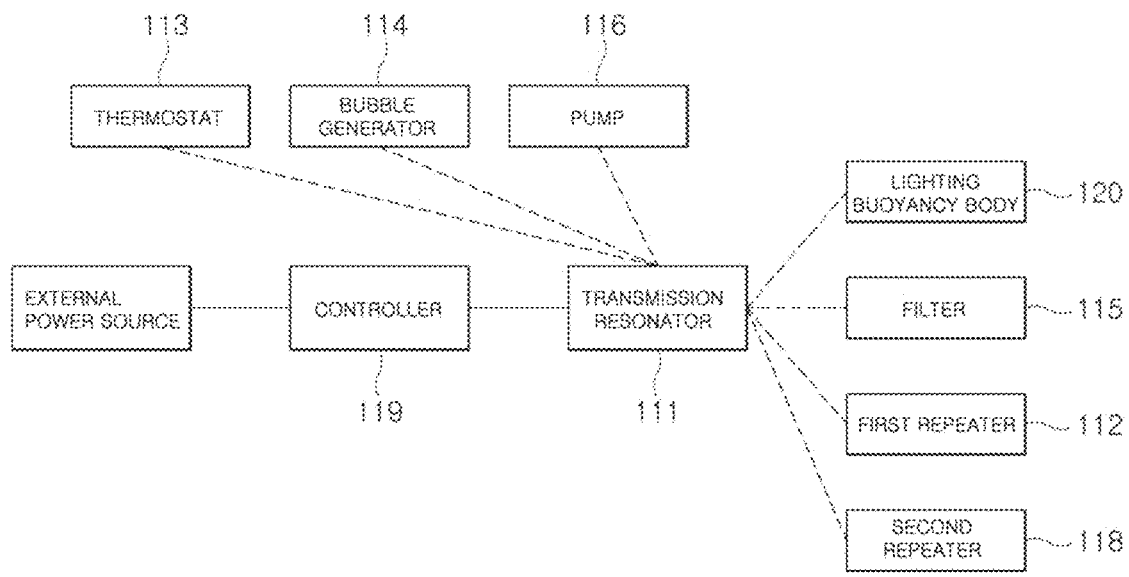
FIG. 3 is a view illustrating a power-supply and communication configuration of the aquarium with wireless lighting illustrated in FIG. 2.

FIGS. 1 to 3 illustrate an aquarium 100 with wireless lighting according to an embodiment of the present invention. FIG. 1 is a view illustrating an overall configuration of the aquarium 100 with wireless lighting according to the embodiment, FIG. 2 is a view illustrating the aquarium 100 with wireless lighting illustrated in FIG. 1 when devices such as a repeater, a thermostat, a bubble generator, a pump, and a controller are additionally installed on the aquarium 100, and FIG. 3 is a view illustrating a power-supply and communication configuration of the aquarium 100 with wireless lighting.

Referring to FIGS. 1 to 3, the aquarium 100 with wireless lighting according to example embodiments of the present invention is a wireless-lighting aquarium in which power is supplied from a transmission resonator to a reception resonator by a magnetic resonance wireless power transmission method as described above so as to operate a light. The aquarium 100 generally includes a water tank 110 and lighting buoyancy bodies 120.

The water tank 110 includes a transmission resonator 111 provided on a bottom surface of the water tank 110 and connected to an AC power source, and water is filled in the water tank 110.

Figure 4:
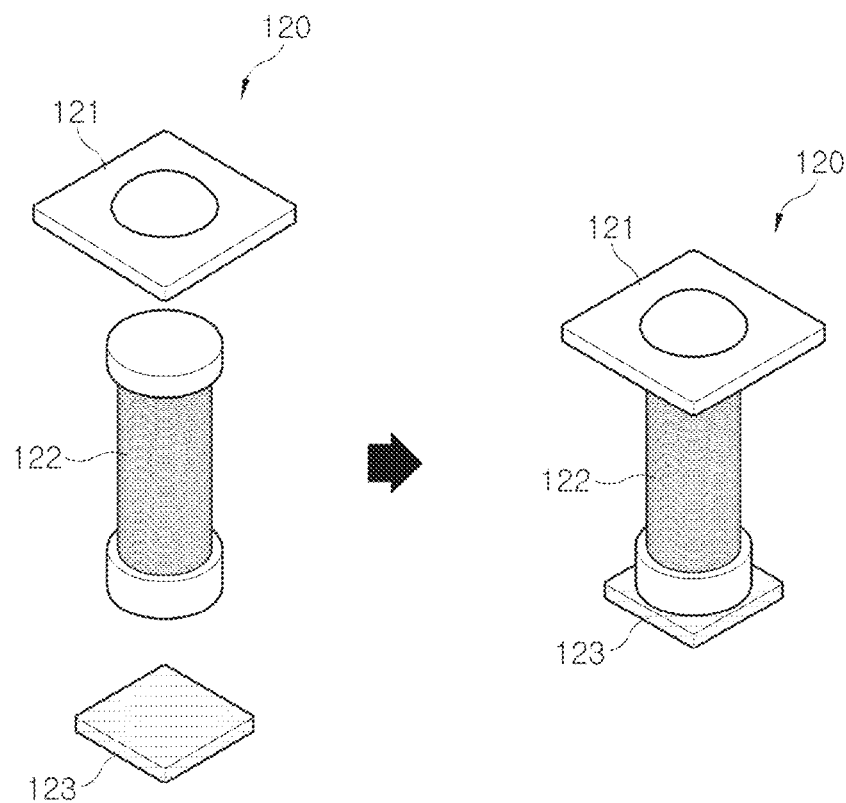
FIG. 4 is a view illustrating a configuration of a lighting buoyancy body of the aquarium with wireless lighting according to an embodiment of the present invention.

The lighting buoyancy bodies 120 may have a specific gravity less than that of water 105 filled in the water tank 110, and as shown in FIG. 4, each of the lighting buoyancy bodies 120 may include a lighting device 121 configured to illuminate the water tank 110, a reception resonator 122 connected to the lighting device 121, and a first magnetic part 123 configured to be magnetized by a magnetic field generated by the transmission resonator 111.

In the aquarium 100 with wireless lighting according to example embodiments of the present invention, the lighting devices 121 of the lighting buoyancy bodies 120 may be operated by transmitting power from the transmission resonator 111 to the reception resonators 122 by wireless, and magnetic force applied to the first magnetic parts 123 of the lighting buoyancy bodies 120 by a magnetic field generated by the transmission resonator 111 may be controlled using a controller 119 so as to vertically move the lighting buoyancy bodies 120 in the water 105 of the water tank 110. In more detail, the lighting buoyancy bodies 120 may be moved downward in the water tank 110 by adjusting an attractive magnetic force applied from the transmission resonator 111 to the first magnetic parts 123 to be greater than buoyancy applied to the lighting buoyancy bodies 120, and the lighting buoyancy bodies 120 may be moved upward in the water tank 110 by adjusting the attractive magnetic force applied from the transmission resonator 111 to the first magnetic parts 123 to be less than the buoyancy applied to the lighting buoyancy bodies 120.

Preferably, at least one second magnetic part 117 may be arranged around the transmission resonator 111. Then, the second magnetic part 117 is magnetized by a magnetic field generated by the transmission resonator 111, and magnetic force pulling the first magnetic parts 123 is generated in response to magnetic fields generated by the transmission resonator 111 and the second magnetic part 117. Attractive force induced by magnetic fields generated by the transmission resonator 111 and the second magnetic part 117 and applied to the first magnetic parts 123 may be adjusted to be greater or less than buoyancy applied to the lighting buoyancy bodies 120 so as to vertically move the lighting buoyancy bodies 120 in the water tank 110.

Preferably, a first repeater 112 including a coil therein to relay magnetic resonance between the transmission resonator 111 and the reception resonators 122 may be installed on a lateral side of the water tank 110.

Figure 6:
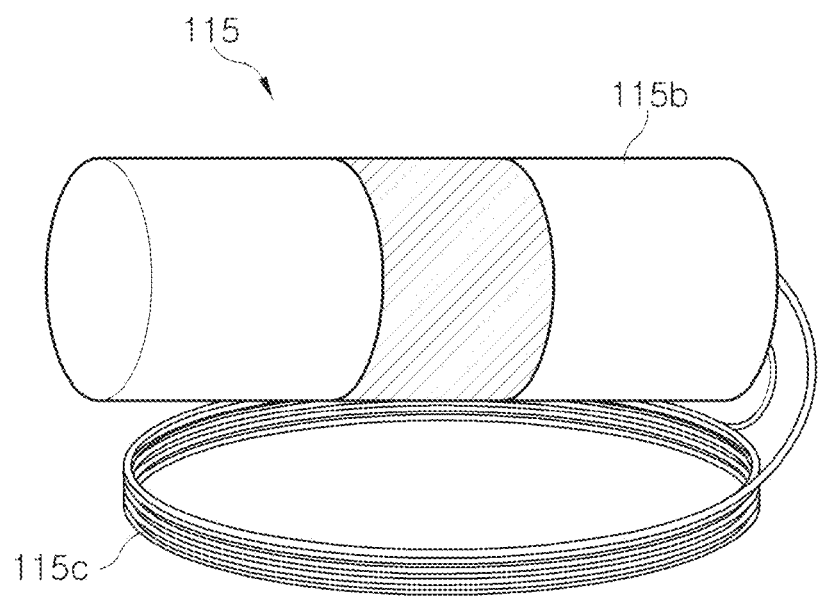
FIG. 6 is a view illustrating a configuration of a filter of the aquarium with wireless lighting according to an embodiment of the present invention.

In addition, at least one of a thermostat 113, a bubble generator 114, and a filter 115 each including a reception resonator may be placed in the water tank 110. In this case, the devices may receive power from the transmission resonator 111 regardless of the directions of resonant coils of the reception resonators of the devices. However, if the first repeater 112 or a second repeater 118 (described later) is installed to relay resonance of the transmission resonator 111, it may be helpful that the devices receive power in a wider range from more distant positions. In addition, the filter 115 is for removing pollutants from the water 105, and as shown in FIG. 6, the filter 115 may include a filter body 115b and a reception resonant coil 115c as a reception resonator.

Preferably, the thermostat 113, the bubble generator 114, or the filter 115 may have a specific gravity less than that of water and may further include a third magnetic part responding to a magnetic field generated by the transmission resonator 111 such that the thermostat 113, the bubble generator 114, or the filter 115 may be vertically moved in the water tank 110 by adjusting the strength of a magnetic field generated by the transmission resonator 111. Like the principle according to which the lighting buoyancy bodies 120 are moved, the thermostat 113, the bubble generator 114, or the filter 115 may be moved in the water tank 110. Since the filter 115 can filter the water 105 filled in the water tank 110 while moving to every nook and corner of the water tank 110 as described above, filtering performance may be increased, and since temperature control is possible while moving the thermostat 113, fast temperature control may be facilitated. In addition, since the bubble generator 114 can be moved, anaesthetic effect of moving a bubble generating part and a function effect of uniformly generating bubbles may be obtained.

In addition, a device for applying upward force to the water 105 of the water tank 110 may be placed on the bottom surface of the water tank 110 so as to push upward the lighting buoyancy bodies 120 in the water 105 such that the lighting buoyancy bodies 120 may smoothly rise to the surface of the water 105. Any device may be unrestrictedly used as the device for applying upward force to the water 105. For example, a pump 116 may be preferably used to apply upward force to the water 105.

In more detail, it is required to reduce buoyancy applied to the lighting buoyancy bodies 120 for moving the lighting buoyancy bodies 120 with a small magnetic force. In this case, however, the lighting buoyancy bodies 120 lowered by a magnetic field may not easily move back to the surface of the water 105 because of weak buoyancy. In this case, the pump 116 installed in a lower portion of the aquarium 100 may be operated to pump the water 105 upward and thus to move the lighting buoyancy bodies 120 upward to the surface of the water 105. In this case, the pump 116 may be operated in a direction other than the upward direction to move the lighting buoyancy bodies 120 in the direction.

In addition, mono-color light emitting diodes (LEDs) or color LEDs may be used as the lighting devices 121.

In addition, a transmission resonant coil of the transmission resonator 111 and reception resonant coils of the reception resonators 122 may be arranged in parallel to each other to face each other. That is, since the transmission resonant coil is arranged in parallel to the bottom surface of the water tank 110, if the reception resonant coils are arranged in parallel to the bottom surface of the water tank 110, the transmission resonant coil may face the reception resonant coils.

Figure 5:
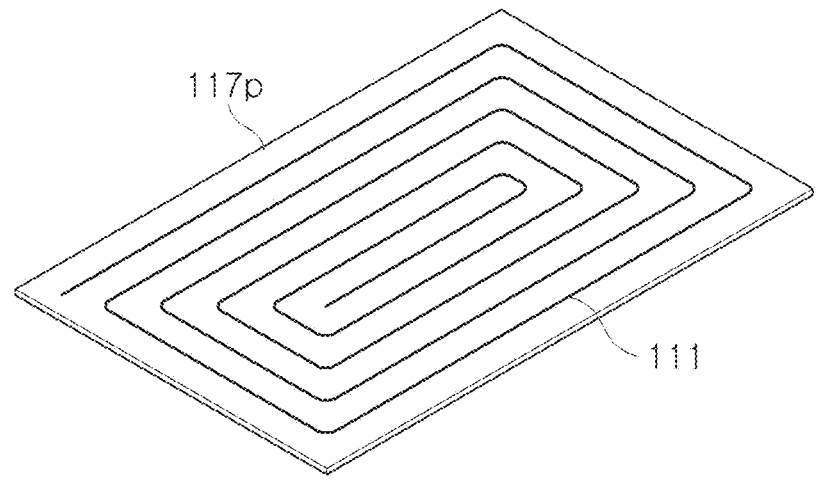
FIG. 5 is a view illustrating an example in which a flat magnetic part installed under a transmission resonator in the aquarium with wireless lighting of an embodiment of the present invention.

In addition, at least one second magnetic part 117 configured to be magnetized by a magnetic field generated by the transmission resonator 111 may be arranged around the transmission resonator 111. This is for generating a stronger magnetic force at the transmission resonator 111 by using the principle of electromagnetism. The second magnetic part 117 may be arranged inside or outside the coil of the transmission resonator 111 without contact with the coil of the transmission resonator 111, preferably at a position at which induction by the coil is facilitated. Here, the first magnetic parts 123 of the lighting buoyancy bodies 120, and the second magnetic part 117 of the transmission resonator 111 may preferably be formed of magnetic materials that are magnetized by a magnetic field and then demagnetized when the magnetic field is removed. As shown in FIG. 2, a plurality of second magnetic parts 117 having a certain size may be arranged around the coil of the transmission resonator 111, or as shown in FIG. 5, a second magnetic part 117p having a flat plate shape may be arranged under the coil of the transmission resonator 111 (that is, the coil of the transmission resonator 111 may be installed on the upper surface of the second magnetic part 117p having a flat plate shape).

In addition, the second repeater 118 including a coil therein to relay magnetic resonance may be further arranged between the transmission resonator 111 and the reception resonators 122. In this case, the second repeater 118 may be arranged in parallel to the resonant coil of the transmission resonator 111 or may be arranged at a predetermined angle from the resonant coil of the transmission resonator 111. If the second repeater 118 is inclined as described above, the degree of arrangement freedom of the resonant coils of the reception resonators 122 may be increased. In addition, preferably, the second repeater 118 may be formed of a part (material) having the same transmittance as water so as to provide an aesthetic effect as being transparently viewed in water.

In addition, the controller 119 may be installed on a predetermined portion of the water tank 110 to control the transmission resonator 111.

In addition, the lighting buoyancy bodies 120 may be maintained at a predetermined depth in the water 105 of the water tank 110 by controlling the transmission resonator 111 to adjust magnetic force applied to the first magnetic parts 123 of the lighting buoyancy bodies 120. That is, if the magnitude of magnetic force is maintained at a constant level by controlling a magnetic field generated by the transmission resonator 111, lights (the lighting buoyancy bodies 120) may be placed in the middle of the aquarium 100 (the water tank 110).

In addition, at least one propelling device may be installed on each of the lighting buoyancy bodies 120 so as to smoothly move the lighting buoyancy bodies 120 in the water 105. Although the propelling device is not limited to a particular device, a pump capable of providing propelling force in water may be preferably used as the propelling device. In the same manner as the pump installed in a lower portion of the aquarium 100 (water tank 110), the propelling devices, for example, pumps installed on the lighting buoyancy bodies 120 may be operated while receiving power from the reception resonant coils connected to the pumps.

As described above, in the aquarium 100 according to example embodiments of the present invention, the lighting devices 121 may be powered by wireless, and the lighting devices 121 may be vertically moved or may be maintained in an submerged state by wireless, thereby providing better aesthetic effects than aquarium lighting methods of the related art.

In addition, since power is supplied to the lighting devices 121 provided in the aquarium 100 by a wireless power transmission method instead of using wires, ornamental fish in the water tank 110 or a user (custodian) managing the aquarium 100 may be fundamentally prevented from being electrocuted or struck by electricity.

While example embodiments of the present invention have been shown and described above in detail, the present invention is not limited thereto. That is, it will be apparent to those skilled in the art that various modifications and variations could be made without departing from the spirit and scope of the present invention. Therefore, the scope of the present invention should be construed according to the appended claims, and it should be understood that all technical ideas equivalent to those described above are within the scope of the present invention.

What is claimed is:

1. An aquarium with wireless lighting, the aquarium comprising:
    a water tank comprising a transmission resonator located at a bottom thereof and connected to an AC power source, the water tank being configured to be filled with water; and
    a lighting buoyancy body comprising a lighting device having a specific gravity less than a specific gravity of the water filled in the water tank and configured to illuminate the water tank, a reception resonator connected to the lighting device, and a first magnetic part,
    wherein the lighting device of the lighting buoyancy body is configured to be operated by transmitting power from the transmission resonator to the reception resonator wirelessly, wherein attractive force pulling the first magnetic part is generated in response to a magnetic field generated by the transmission resonator,
    wherein when the attractive force is adjusted to be greater than buoyancy applied to the lighting buoyancy body, the lighting buoyancy body is moved downward in the water tank, and
    wherein when the attractive force is adjusted to be less than buoyancy applied to the lighting buoyancy body, the lighting buoyancy body is moved upward in the water tank.

2. The aquarium of claim 1, wherein a surface of a transmission resonant coil of the transmission resonator and a surface of a reception resonant coil of the reception resonator are arranged in parallel to each other such that the surfaces face each other.

3. The aquarium of claim 1, wherein at least one second magnetic part configured to be magnetized by the magnetic field generated by the transmission resonator is arranged around the transmission resonator.

4. The aquarium of claim 1, wherein a first repeater comprising a coil therein is provided on a lateral side of the water tank to relay magnetic resonance between the transmission resonator and the reception resonator.

5. The aquarium of claim 1, wherein a repeater comprising a coil therein is placed between the transmission resonator and the reception resonator to relay magnetic resonance therebetween.

6. The aquarium of claim 1, wherein at least one of a thermostat, a bubble generator, or a filter, which comprises a reception resonator, is in the water tank.

7. The aquarium of claim 6, wherein the thermostat, the bubble generator, or the filter has a specific gravity less than a specific gravity of water and further comprises a third magnetic part, and the third magnetic part is configured to respond to the magnetic field generated by the transmission resonator such that the thermostat, the bubble generator, or the filter is vertically moved in the water tank according to control of strength of the magnetic field.

8. The aquarium of claim 1, wherein the lighting buoyancy body is maintained at a predetermined depth in the water of the water tank by adjusting magnitude of a magnetic force applied to the first magnetic part of the lighting buoyancy body through control of strength of the magnetic field generated by the transmission resonator.

9. The aquarium of claim 1, wherein a pump configured to apply upward force to the water filled in the water tank is placed on the bottom surface of the water tank so as to move upward the lighting buoyancy body submerged in the water of the water tank.

10. The aquarium of claim 1, wherein at least one propelling device is on the lighting buoyancy body for smooth movement of the lighting buoyancy body in the water.

* * * * *